May 12, 1925.
A. C. PRESCOTT ET AL
1,537,375
CONTROL SYSTEM FOR ADJUSTABLE SPEED MOTORS
Filed Dec. 16, 1924
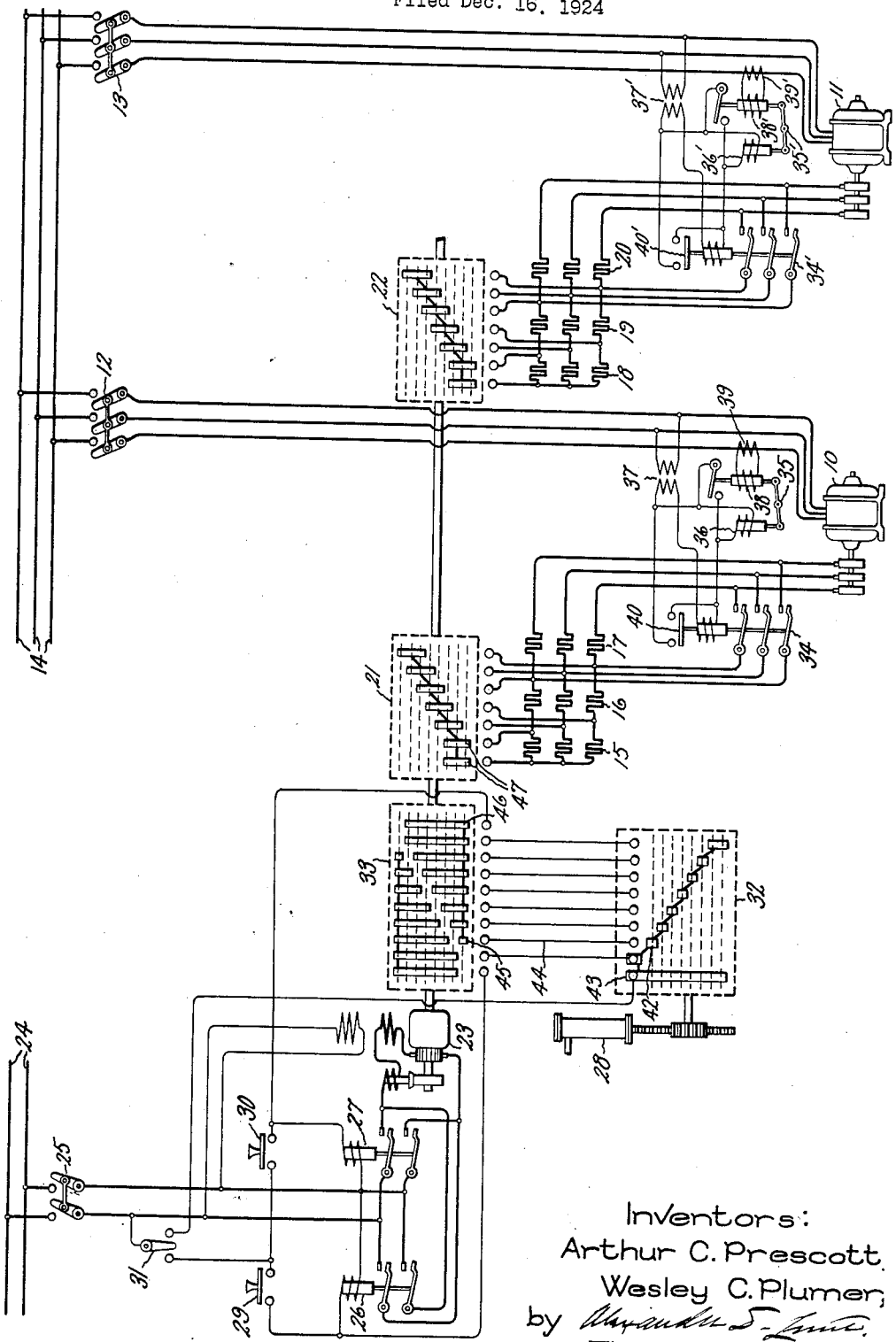
Inventors:
Arthur C. Prescott,
Wesley C. Plumer,
by
Their Attorney.

Patented May 12, 1925.

1,537,375

UNITED STATES PATENT OFFICE.

ARTHUR C. PRESCOTT, OF EAST ORANGE, NEW JERSEY, AND WESLEY C. PLUMER, OF SCHENECTADY, NEW YORK, ASSIGNORS TO GENERAL ELECTRIC COMPANY, A CORPORATION OF NEW YORK.

CONTROL SYSTEM FOR ADJUSTABLE-SPEED MOTORS.

Application filed December 16, 1924. Serial No. 756,327.

*To all whom it may concern:*

Be it known that we, ARTHUR C. PRESCOTT, a citizen of the United States, residing at East Orange, in the county of Essex, State of New Jersey, and WESLEY C. PLUMER, a citizen of the United States, residing at Schenectady, in the county of Schenectady, State of New York, have invented certain new and useful Improvements in Control Systems for Adjustable Speed Motors, of which the following is a specification.

This invention relates to motor control systems, and more particularly to control systems for a plurality of adjustable speed electric motors and has for its object the provision of a novel arrangement of control apparatus and circuits whereby the motors may be automatically accelerated and operated separately or jointly at each of a plurality of running speeds.

Although not necessarily limited thereto, the invention is of particular advantage where it is desired to operate several motors at a plurality of speeds under the control of an automatic device which is responsive to predetermined conditions. Thus, by means of the present invention two or more motor driven boiler feed pumps may be operated separately or jointly at any one of a plurality of speeds under the control of an automatic pressure regulator which is responsive to variations in boiler pressure. With such an arrangement, conditions may arise where it is desired to start one of the motor driven pumps when the automatic speed adjusting or controlling mechanism is set near the maximum speed position. In accordance with the present invention, automatic switch mechanism constituting an acceleration controller is provided for protecting each of the driving motors during starting independently of the position of the automatic speed adjusting mechanism in order to maintain the starting current of the motor within desirable limits as well as to insure a smooth and gradual acceleration of the boiler feed pump to the predetermined running speed.

For a better understanding of the invention, reference is had to the following description taken in connection with the accompanying drawing in which the single figure diagrammatically illustrates the invention embodied in an automatic pressure responsive control system for a plurality of adjustable speed motors.

The novel features and combinations which we believe to be characteristic of our invention are pointed out with particularity in the appended claims.

Referring to the drawing, the adjustable speed electric motors 10 and 11 are shown as of the alternating current induction type, and are each mechanically connected to drive a suitable load (not shown). The invention will be described on the assumption that each motor drives a boiler feed pump. The line switches 12 and 13 are provided for connecting the respective motors 10 and 11 to the supply lines 14 and the speed regulating resistors 15, 16, 17 and 18, 19, 20, are connected respectively in the secondary circuit thereof. The drum controllers 21 and 22 are suitably connected as indicated in the drawing to be simultaneously operated by the pilot motor 23 in order to control the speed regulating resistors 15, 16 and 18, 19, of the respective motors so that these motors operate at the same speed at running speeds which bear a predetermined relation to each other.

The pilot motor 23, as shown, is of the direct current type and is energized from the supply lines 24 through the disconnecting switch 25 and one of the reversing contactors 26 and 27 which are closed either under the automatic control of the pressure regulator 28 or under the control of one of the manual push buttons 29 and 30 depending upon the position of the selective control switch 31.

The drum controller 32 is mechanically connected through suitable gearing, as indicated in the drawing, to be operated by the pressure regulator 28 to a plurality of positions responsively to different predetermined pressure conditions and the cooperating drum controller 33 is mechanically operated by pilot motor 23 and is interconnected with the controller 32 as shown to control the energization of the reversing contactors 26 and 27 so as to cause the pilot motor 23 to operate the controller 33 a corresponding amount in a corresponding direction to the movement of controller 32 by the automatic pressure regulator 28.

It will be observed that each of the motors 10 and 11 is provided respectively with automatic accelerating switch mechanism comprising a contactor 34 and 34' and a relay 35 and 35' for automatically controlling a portion of the speed regulating resistors connected in the secondary circuit thereof. The contactor 34 is connected to control a short circuit around the resistance 17 and is under the control of the relay 35 which has a winding 36 energized responsively to the voltage impressed upon motor 10 through the potential transformer 37 and a second winding 38 energized responsively to the current supplied to motor 10 through the current transformer 39. The contactor 34' and the relay 35' associated with the motor 11 are arranged in a similar manner.

With the parts thus constructed and arranged and in their respective positions as shown in the drawing, the operation of the control system embodying the present invention is as follows: With the supply lines 14 and 24 energized from a suitable source of supply, either of the separately operable line switches 12 and 13 may be closed to selectively operate either the motor 10 or the motor 11. If the line switch 12 is closed, motor 10 is energized from the supply line 14 and at once starts to accelerate the boiler feed pump driven thereby with all of the speed regulating resistors 15, 16 and 17 connected in the secondary circuit. Upon the energization of motor 10, the operating winding of contactor 34 and the winding 36 of relay 35 are energized in series circuit through the potential transformer 37 responsively to the voltage impressed upon motor 10. The resistance of winding 36 however is sufficient to maintain the resulting current flow below the value required to close contactor 34 and the magnetic attraction of winding 36 tends to operate the contact of relay 35 to the closed position. The winding 38 of relay 35, however, is energized responsively to the starting current of motor 10 through the current transformer 39 and serves to maintain the contact of relay 35 in the open position so long as the starting current of motor 10 is above a predetermined value. When the starting current of motor 10 decreases below the predetermined value, relay 35 is closed by the winding 36, thereby short circuiting the winding 36 and operatively energizing contactor 34. Contactor 34 at once closes and short circuits the accelerating resistors 17, thus automatically accelerating the motor 10 to its first running speed. It will be observed that as the contactor 34 closes the auxiliary contact 40 with which it is provided establishes a short circuit around the winding 36 of relay 35 which serves to maintain the contactor 34 operatively energized independently of the relay 35.

The disconnecting switch 25 for pilot motor 23 may now be closed and the selective switch 31 moved to its right hand position to place the motor 10 under the control of the automatic pressure regulator 28. The follow-up arrangement of the drum controllers 32 and 33 is such that when the controller 32 is operated by the pressure regulator 28 responsively to a predetermined decrease in pressure to bring the contact segment 42 into engagement with the stationary contact cooperating therewith, an energizing circuit for the reversing contactor 27 is established from the upper of the supply lines 24 through the left hand blade of disconnecting switch 25, the selective switch 31 in its right hand position, the contacts 43 and 42 of drum controller 32, the conductor 44, the contact segments 45 and 46 of drum controller 33 and thence through the operating winding of contactor 27 and the right hand blade of disconnecting switch 25 to the lower of the supply lines 24. The resulting closure of reversing contactor 27 connects the pilot motor 23 to the supply line 24 for operation in a direction required to move the contact segments 47 of the speed controller 21 into engagement with the stationary contacts cooperating therewith to short circuit one phase of the speed regulating resistance 16 and thereby accelerate motor 10 to its second running speed. It will be observed that the relative arrangement of the controllers 21 and 33 are such that after the engagement of the contact segment 47 of controller 21 with the stationary contact cooperating therewith, the contact segment 45 of controller 33 disengages the cooperating stationary contact and thereby interrupts the energizing circuit of contactor 27. Contactor 27 at once opens and disconnects the motor 23 from the supply line 24.

As the boiler pressure, to which the pressure regulator 28 is responsive, further decreases, the drum controller 32 is operated to engage successive contact segments with the stationary contacts cooperating therewith and the pilot motor 23 is successively energized to rotate the controller 33 as well as the speed controllers 21 and 22 to corresponding positions. In this way the speed regulating resistors 15 and 16 are successively short circuited and motor 10 is accelerated to each of its running speeds as the segments of speed controller 21 are successively brought into engagement with the stationary contacts cooperating therewith.

It will be observed that although under the operating conditions just described motor 11 was not in operation nevertheless the speed controller 22 was simultaneously operated to control the resistors 18 and 19 in the secondary circuit thereof in the same manner as the resistors 15 and 16 were controlled by the speed controller 21. However, in accordance with our invention the acceleration of motor 11 during starting is controlled by the automatic switch mechanism comprising the contactor 34' and the relay 35' independently of the operation of the speed controller 22. Thus when the line switch 13 is closed to connect motor 11 to the supply line 14, the motor may start with the resistors 18 and 19 short circuited by speed controller 22 and with only the resistors 20 connected in the secondary circuit. While the starting current of motor 11 is above a predetermined value, the winding 38' of relay 35' is sufficiently energized from the current transformer 39' to prevent the closure of the relay by winding 36' which is energized in series with the operating winding of contactor 34' from the potential transformer 37'. However after motor 11 has partially accelerated and the current has decreased below a predetermined value, the relay 35' is permitted to close and short circuit the winding 36', thereby operatively energizing the contractor 34'. Upon the resulting closure of contactor 34', the resistors 20 are short circuited to further accelerate motor 11 to the predetermined running speed for which speed controller 22 has been set by the automatic pressure regulator 28. A holding circuit for contactor 34' is established through the auxiliary contact 40' upon the closure thereof. Thus it will be seen that motor 11 is automatically accelerated to the same running speed as motor 10 and thereafter the speed of both motors is automatically controlled by the pressure regulator 28, in an obvious manner.

It will be understood that motor 11 may be selected for initial operation under the control of the pressure regulator 28 and the motor 10 may then be connected to the supply line 14 and automatically accelerated to the same running speed as motor 11 in a similar manner to that previously described.

With the selective control switch 31 in the left hand position, the automatic speed control of motors 10 and 11 is discontinued and the push buttons 29 and 30 then may be manually operated to close the contactors 26 and 27 respectively and thereby energize the pilot motor 23 to simultaneously move the speed controllers 21 and 22 to any desired position. It will be evident that any desired number of additional motor driven pumps may be provided with speed controlling switch mechanism which is arranged to be operated by the pilot motor 23 together with automatic accelerating switch mechanism and separately operable line switches.

In accordance with the provisions of the patent statutes we have described the principle of operation of our invention together with the apparatus which we now consider to represent the best embodiment thereof, but we would have it understood that the apparatus shown is only illustrative and that the invention may be carried out by other means.

What we claim as new and desire to secure by Letters Patent of the United States, is:—

1. A control system for a plurality of adjustable speed electric motors, comprising separate speed adjusting means for each of said motors, the said means being interconnected to be simultaneously operated, a common automatically operated regulator for the said means for simultaneously adjusting the speeds of all of the motors in response to a predetermined condition, separately operable switch mechanism for selectively connecting the said motors to a source of supply to be under the control of said regulator, and an automatically operated acceleration controller for each of said motors for protecting the same during the starting thereof, regardless of the position of said regulator.

2. In a control system for a plurality of electric motors, the combination of separately operable switches for selectively connecting each of said motors to a source of supply for operation thereof, simultaneously operated speed controlling switch mechanisms for said motors, and automatic switch mechanism for controlling the acceleration of each motor during starting independently of said speed controlling switch mechanism.

3. In a control system for a plurality of electric motors, the combination of separately operable switches for selectively connecting each of said motors to a source of supply, automatic speed controlling switch mechanism operable to a plurality of positions to correspondingly vary the speed of each motor, and automatic electro-responsive switch mechanism associated with each motor for controlling the acceleration thereof during starting independently of said speed controlling switch mechanism.

4. In combination, a plurality of electric motors and speed regulating resistors therefor, switch mechanism for selectively connecting each of said motors to a source of supply, means for simultaneously controlling said resistors to operate each motor at substantially the same running speed, and automatic means associated with each motor for controlling the acceleration thereof during starting independently of said first means.

5. In combination, a plurality of electric motors, separately operable switches for selectively connecting each of said motors to a source of supply for operation thereof, speed controlling switch mechanism for each motor, automatic means for controlling said switch mechanisms to operate said motors at substantially the same speed responsively to predetermined conditions, and means responsive to the electrical conditions of each motor for automatically controlling the acceleration thereof during starting independently of the operation of said switch mechanism.

6. The combination of a plurality of alternating current electric motors, each having speed regulating resistors connected in the secondary circuit thereof, selectively operable switch mechanism for connecting each of said motors to a source of supply for operation thereof, switch mechanism for simultaneously controlling said resistors to operate said motors at each of a plurality of speeds, and electro-responsive switch mechanism connected to each of said motors for automatically controlling the speed thereof during starting independently of said first switch mechanism.

7. The combination of a plurality of alternating current electric motors, each having speed regulating resistors connected in the secondary circuit thereof, separately operable line-switches for connecting each of said motors to a source of supply for operation thereof, switch mechanism for controlling the resistors of each motor to operate the same at a plurality of speeds, an automatic device operated responsively to predetermined conditions and arranged to simultaneously control the speed regulating switch mechanism of said motors, and electro-responsive switch mechanism associated with each of said motors and having a winding energized responsively to the current thereof for automatically controlling a portion of said speed regulating resistors during starting independently of said speed regulating switch mechanisms.

In witness whereof, ARTHUR C. PRESCOTT has hereunto set his hand this 11th day of December, 1924, and WESLEY C. PLUMER has hereunto set his hand this 15th day of December, 1924.

ARTHUR C. PRESCOTT.
WESLEY C. PLUMER.